(12) United States Patent
Nishio

(10) Patent No.: US 10,152,850 B2
(45) Date of Patent: Dec. 11, 2018

(54) CHECKOUT UNIT ASSEMBLY AND BASE FOR CHECKOUT UNIT ASSEMBLY

(71) Applicant: NEC Corporation, Tokyo (JP)

(72) Inventor: Jun Nishio, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/548,036

(22) PCT Filed: Jan. 26, 2016

(86) PCT No.: PCT/JP2016/052065
§ 371 (c)(1),
(2) Date: Aug. 1, 2017

(87) PCT Pub. No.: WO2016/129378
PCT Pub. Date: Aug. 18, 2016

(65) Prior Publication Data
US 2018/0025592 A1    Jan. 25, 2018

(30) Foreign Application Priority Data
Feb. 12, 2015  (JP) ................. 2015-025353

(51) Int. Cl.
*G06K 7/00* (2006.01)
*G07G 1/00* (2006.01)
(Continued)

(52) U.S. Cl.
CPC ......... *G07G 1/0027* (2013.01); *G06Q 20/202* (2013.01); *G07G 1/0018* (2013.01); *A47F 9/04* (2013.01)

(58) Field of Classification Search
USPC ..... 235/7–28, 7 A, 375, 379, 380, 383, 385; 705/5, 35–45
See application file for complete search history.

(56) References Cited

U.S. PATENT DOCUMENTS 5,492,199 A * 2/1996 Shimoyama ............ A47F 9/046
186/61
7,720,710 B2 * 5/2010 Morrison ................ A47F 9/046
186/61
(Continued)

FOREIGN PATENT DOCUMENTS

JP    2003-044936 A    2/2003
JP    2003-058951 A    2/2003
(Continued)

OTHER PUBLICATIONS

International Search Report, Corresponding to PCT/JP2016/052065, dated Apr. 5, 2016, 2 pages.
(Continued)

*Primary Examiner* — Matthew Mikels
(74) *Attorney, Agent, or Firm* — Wilmer Cutler Pickering Hale and Dorr LLP

(57) ABSTRACT

A checkout unit assembly (1000) has a first checkout unit (100) and a second checkout unit (200) each having a user interface portion (300) at one side portion. The first checkout unit (100) is disposed above the second checkout unit (200) such that the first checkout unit (100) and the second checkout unit (200) overlap when seen in a plan view. The user interface portion (300) of the first checkout unit (100) and the user interface portion (300) of the second checkout unit (200) are disposed on different side surfaces.

18 Claims, 13 Drawing Sheets

(51) Int. Cl.
   *G06Q 20/20*   (2012.01)
   *A47F 9/04*    (2006.01)

(56) References Cited

U.S. PATENT DOCUMENTS

2004/0069848 A1* 4/2004 Persky .................... A47F 9/048
                                                235/383
2011/0057036 A1   3/2011 Matsuhisa et al.
2016/0147268 A1* 5/2016 Wang ..................... G06F 1/182
                                                361/679.21

FOREIGN PATENT DOCUMENTS

| | | |
|---|---|---|
| JP | 2004-227424 A | 8/2004 |
| JP | 2004-307032 A | 11/2004 |
| JP | 2007-293795 A | 11/2007 |
| JP | 2010-140142 A | 6/2010 |
| JP | 2011-054121 A | 3/2011 |
| JP | 2012-164282 A | 8/2012 |
| JP | 2013-218437 A | 10/2013 |
| JP | 2014-002644 A | 1/2014 |
| JP | 2014-006866 A | 1/2014 |
| WO | WO-2005/073935 A1 | 8/2005 |

OTHER PUBLICATIONS

Notification of Reasons for Refusal issued by the Japan Patent Office for Japanese Application No. 2015-181832 dated Aug. 21, 2018 (5 pages).

\* cited by examiner

CHECKOUT UNIT ASSEMBLY AND BASE FOR CHECKOUT UNIT ASSEMBLY

CROSS-REFERENCE TO RELATED APPLICATIONS

The present application is a national stage application of International Application No. PCT/JP2016/052065 entitled "Settlement Processing Unit Cluster and Frame for Settlement Processing Unit Cluster," filed on Jan. 26, 2016, which claims the benefit of priority from Japanese Patent Application No. 2015-025353, filed on Feb. 12, 2015, the disclosures of which are incorporated herein in their entirety by reference thereto.

TECHNICAL FIELD

The present invention relates to a checkout unit assembly and a base for the checkout unit assembly.

BACKGROUND ART

It is common to use a cash register installed in the store in order to perform checkout of goods (hereinafter referred to as purchased goods) which a customer shopping at a store (hereinafter referred to as a purchaser) purchases.

In recent years, in some selling formats, a store clerk performs registration processing of purchased goods by using a goods registration device and a purchaser performs checkout of the registered purchased goods by using a so-called semi-self-register (See Patent Document 1).

Patent Documents 2 and 3 disclose money change apparatus.

RELATED DOCUMENT

Patent Document

[Patent Document 1] Japanese Laid-open Patent Publication No. 2013-218437
[Patent Document 2] Japanese Laid-open Patent Publication No. 2010-140142
[Patent Document 3] Japanese Laid-open Patent Publication No. 2012-164282

SUMMARY OF THE INVENTION

Incidentally, in order to smoothly perform the checkout for a large number of purchasers, it is desirable to install as many checkout devices, for example, semi-self-registers or cash registers as possible in a shop, for allowing checkout as much as possible in parallel.

A limited space in the store, however, limits the number of installable checkout devices.

An object of the present invention is to provide a checkout unit assembly allowing for more checkout in parallel in a limited installation space, and a base for such a checkout unit assembly.

The present invention provides a checkout unit assembly including: a first checkout unit and a second checkout unit each having a user interface portion at one side portion, wherein the first checkout unit is disposed above the second checkout unit such that the first checkout unit and the second checkout unit overlap when seen in a plan view, and the user interface portion of the first checkout unit and the user interface portion of the second checkout unit are disposed on different side surfaces.

The present invention provides a base for a checkout unit assembly, wherein a first checkout unit and a second checkout unit each having a user interface portion at one side portion are to be mounted on the base, the base including: an insertion hole to insert each of the first checkout unit and the second checkout unit, the insertion hole being formed on each of a plurality of side surfaces of the base, wherein, as the first checkout unit is inserted into the insertion hole on one side surface of the base and the second checkout unit is inserted into the insertion hole of another side surface of the base, the first checkout unit and the second checkout unit overlap when seen in a plan view, the first checkout unit is disposed above the second checkout unit, and the user interface portion of the first checkout unit and the user interface portion of the second checkout unit are disposed on different side surfaces of the base.

According to the present invention, more checkout can be performed in parallel in a limited installation space.

Also, a checkout unit assembly to allow for more checkout in parallel in a limited installation space can be assembled with ease.

BRIEF DESCRIPTION OF THE DRAWINGS

The above-described object and other objects, features, and advantages will become more apparent from preferred embodiments which will be described below, and the accompanying drawings attached thereto.

DESCRIPTION OF EMBODIMENTS

Figure 1:
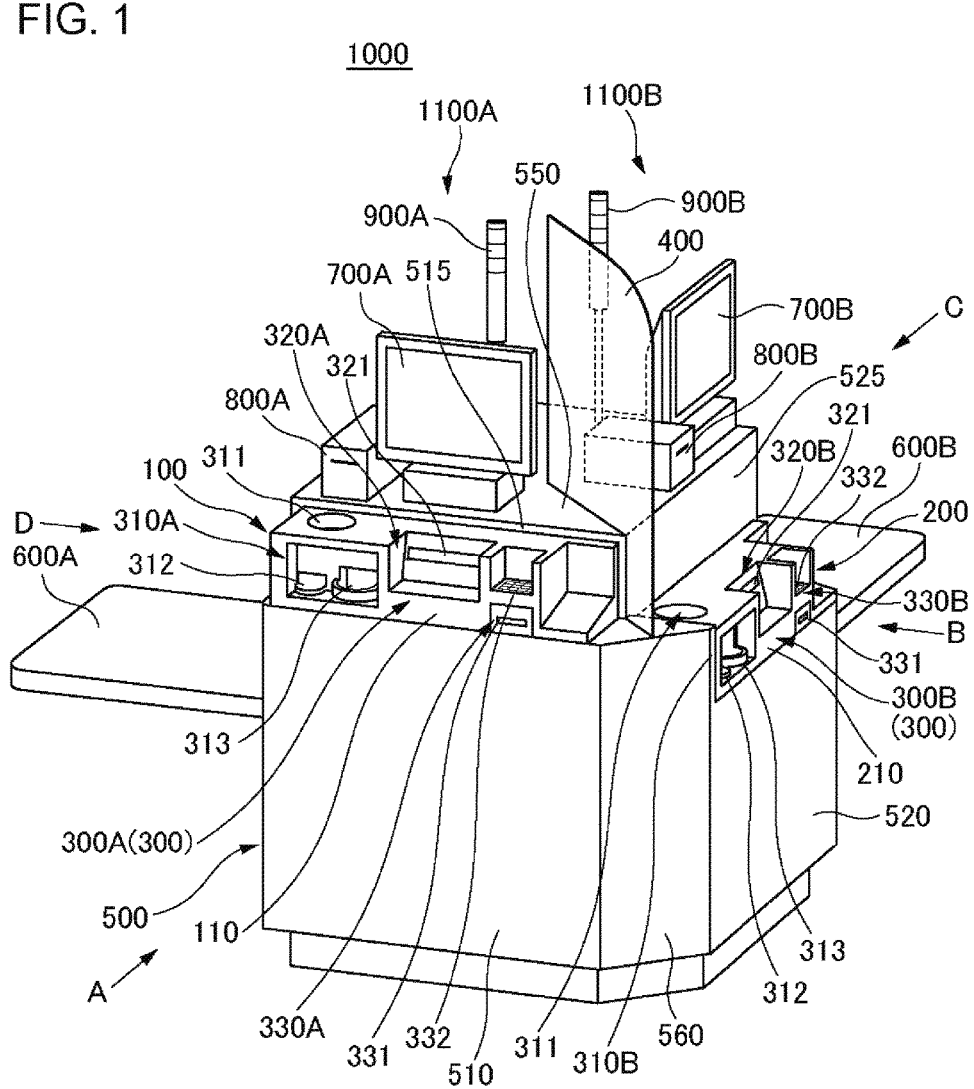
FIG. 1 is a perspective view of a checkout unit assembly according to a first embodiment.

Hereinafter, embodiments of the present invention will be described using the drawings. In all the drawings, the same constituent elements are denoted by the same reference numerals, and description thereof will not be repeated.

[First Embodiment]

FIG. 1 is a perspective view of a checkout unit assembly 1000 according to a first embodiment.

Figure 2:
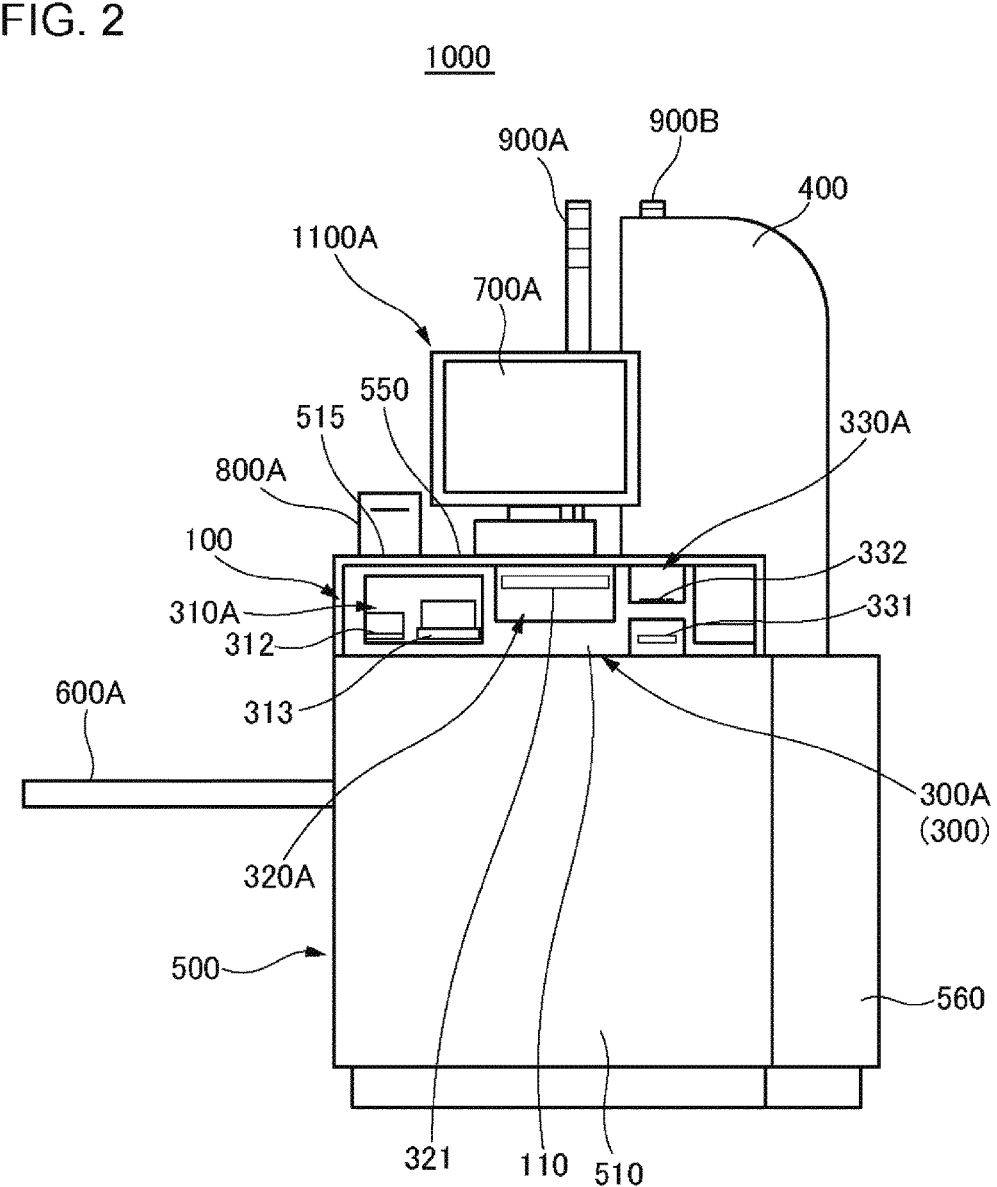
FIG. 2 is a side view of the checkout unit assembly as viewed from a direction of an arrow A of FIG. 1.

FIG. 2 is a side view of the checkout unit assembly 1000 as viewed from a direction of an arrow A of FIG. 1.

Figure 3:
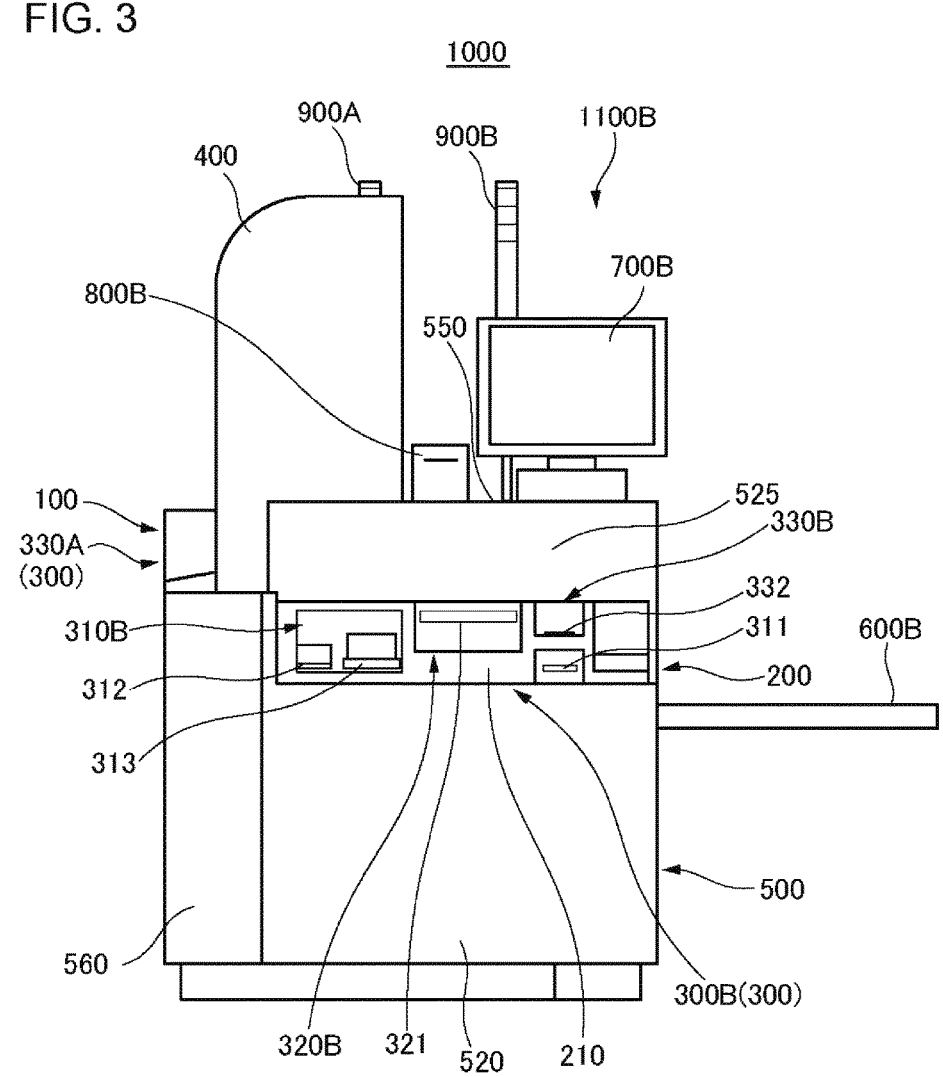
FIG. 3 is a side view of the checkout unit assembly as viewed from a direction of an arrow B of FIG. 1.

FIG. 3 is a side view of the checkout unit assembly 1000 as viewed from a direction of an arrow B of FIG. 1.

Figure 4:
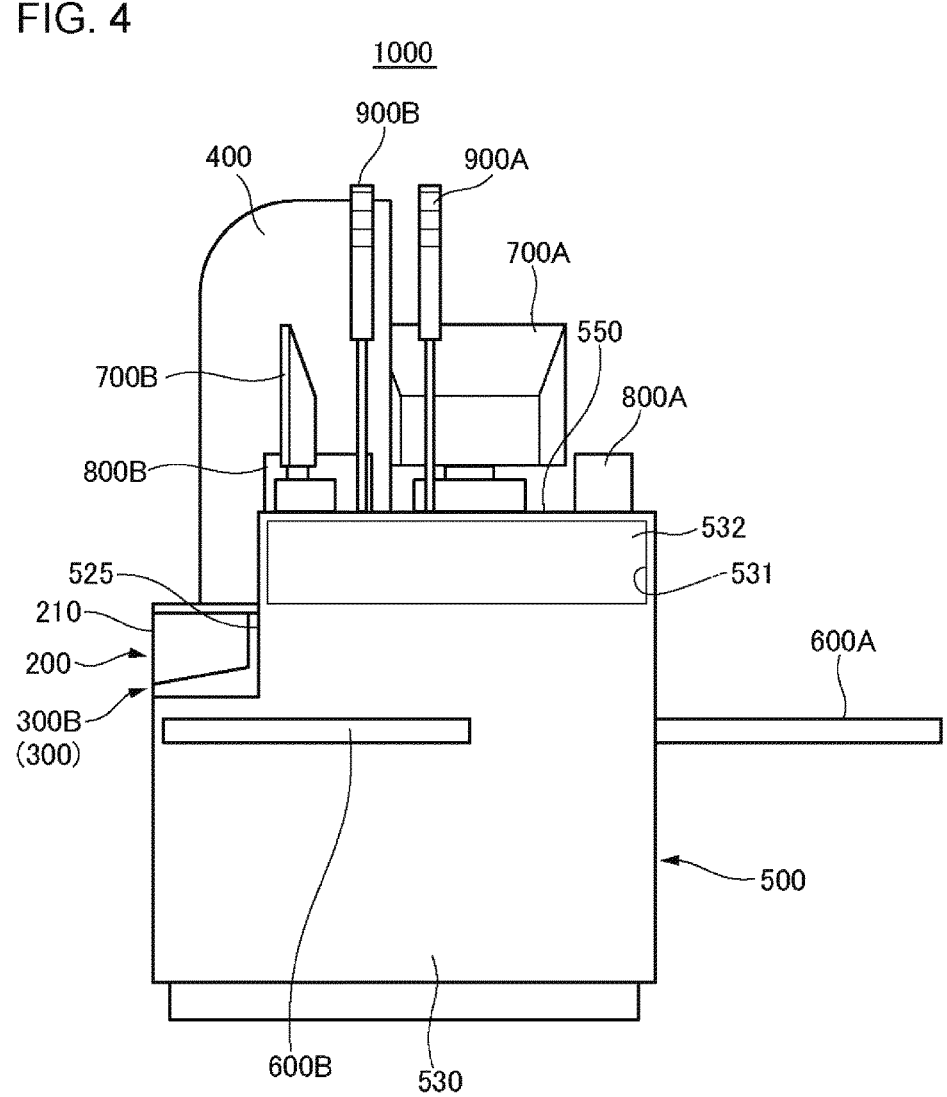
FIG. 4 is a side view of the checkout unit assembly as viewed from a direction of an arrow C of FIG. 1.

FIG. 4 is a side view of the checkout unit assembly 1000 as viewed from a direction of an arrow C of FIG. 1.

Figure 5:
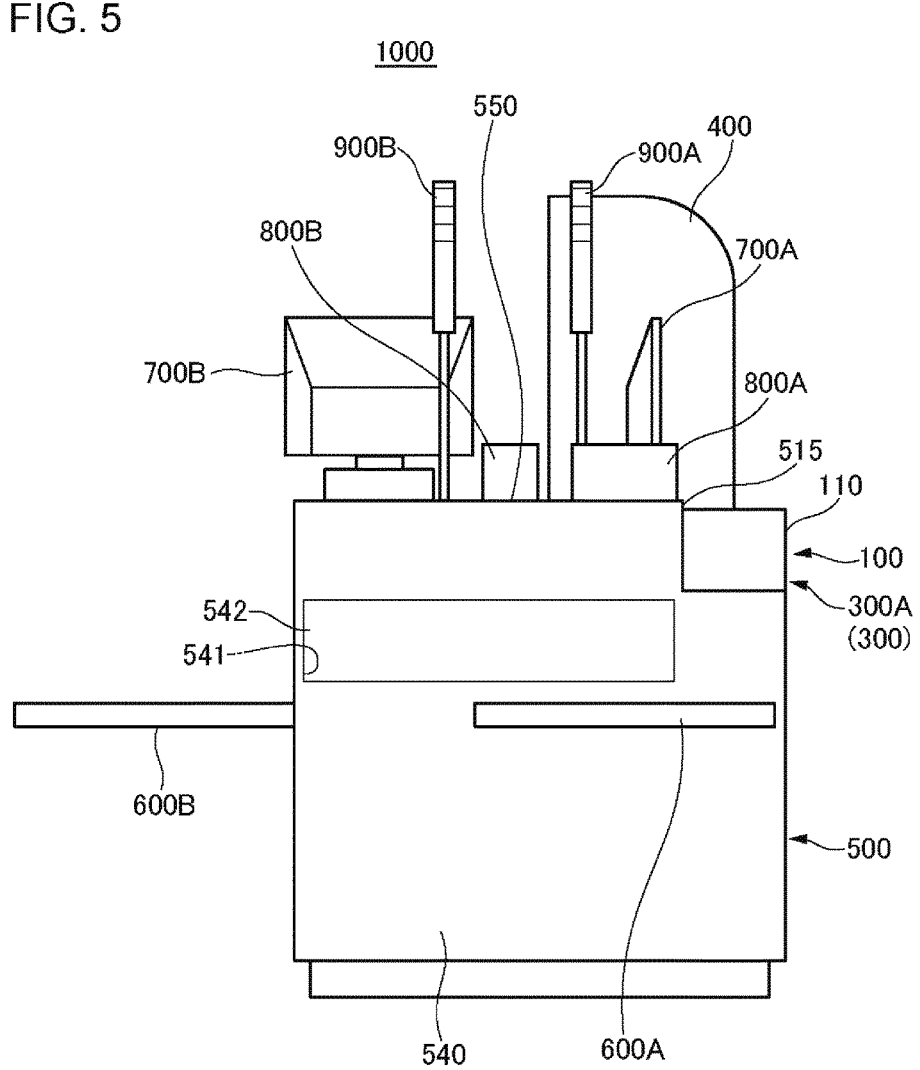
FIG. 5 is a side view of the checkout unit assembly as viewed from a direction of an arrow D of FIG. 1.

FIG. 5 is a side view of the checkout unit assembly 1000 as viewed from a direction of an arrow D of FIG. 1.

Figure 6:
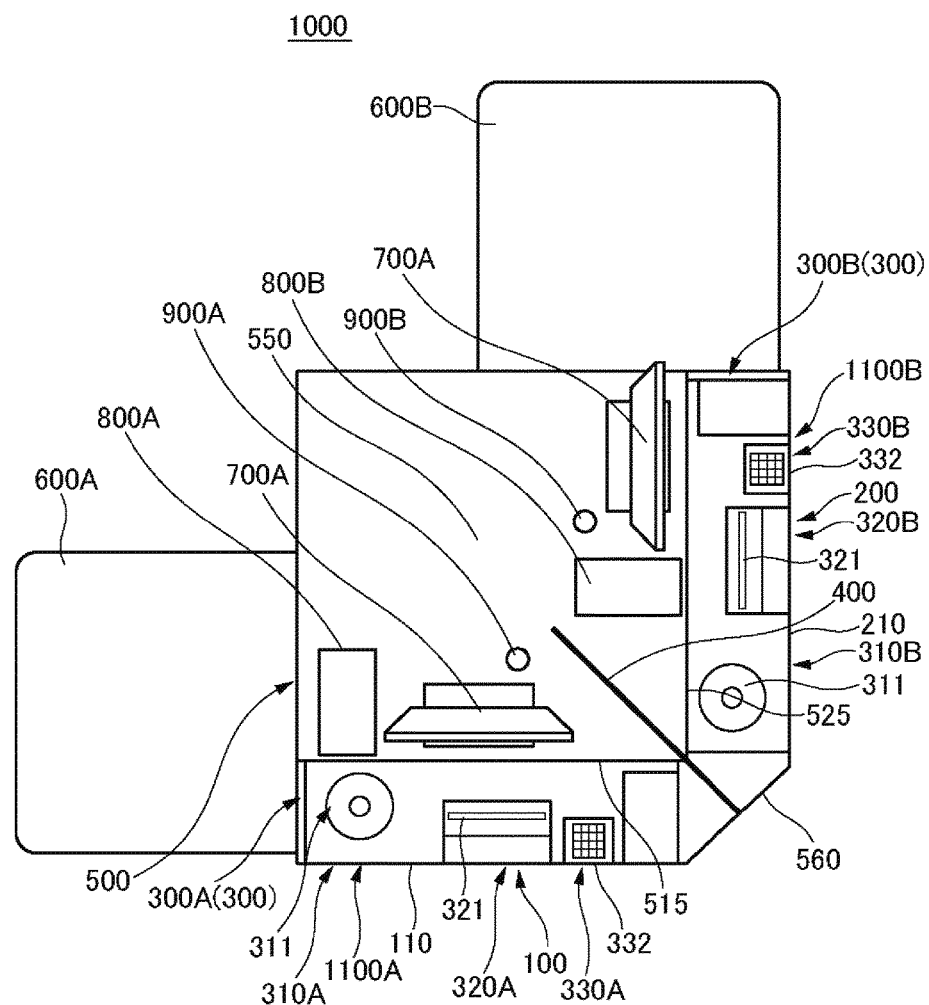
FIG. 6 is a plan view of the checkout unit assembly according to the first embodiment.

FIG. 6 is a plan view of the checkout unit assembly 1000 according to the first embodiment.

Figure 7:
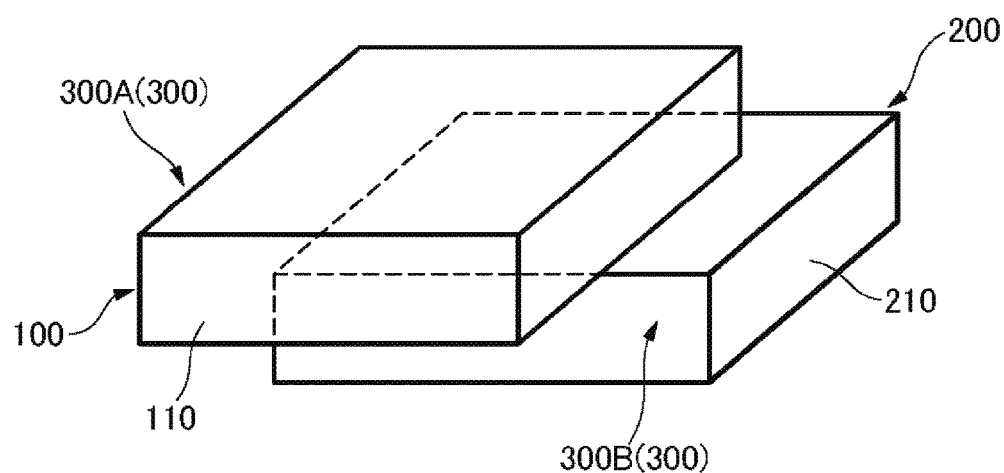
FIG. 7 is a schematic perspective view showing the disposition of a first checkout unit and a second checkout unit in the checkout unit assembly according to the first embodiment.

FIG. 7 is a schematic perspective view showing the disposition of a first checkout unit 100 and a second checkout unit 200 in the checkout unit assembly 1000 according to the first embodiment.

Figure 8:
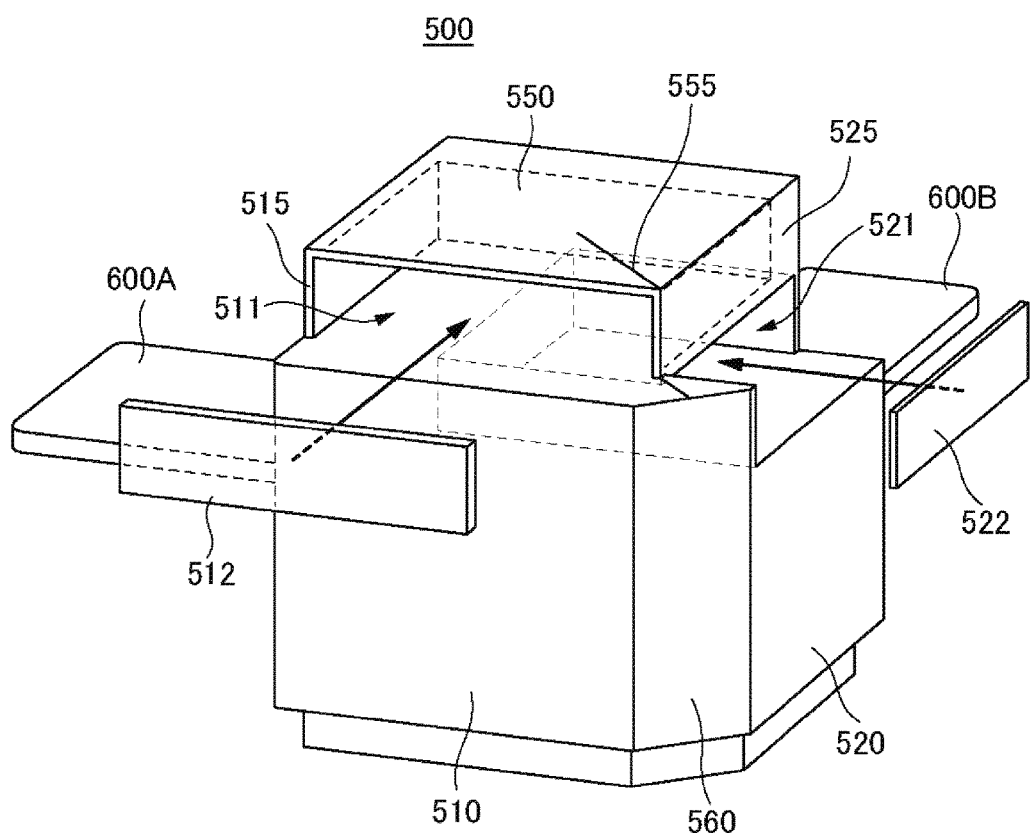
FIG. 8 is a perspective view of a base for a checkout unit assembly according to the first embodiment.

FIG. 8 is a perspective view of a base 500 for a checkout unit assembly according to the first embodiment.

Figure 9:
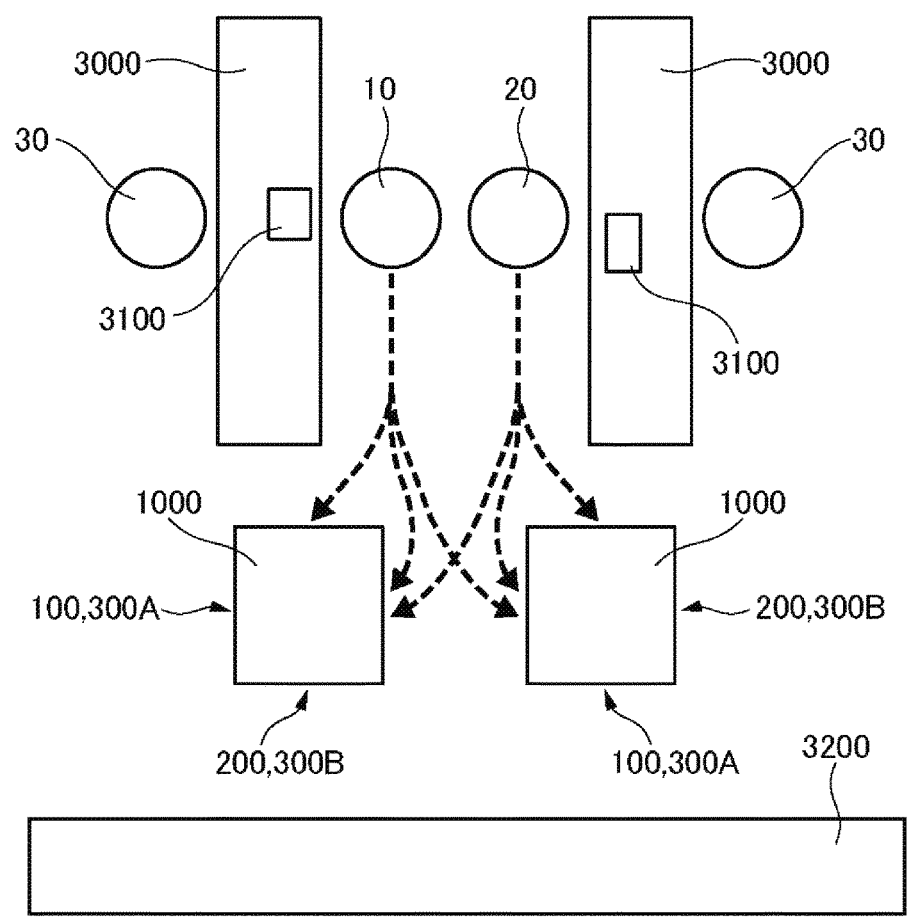
FIG. 9 is a schematic plan view for describing an example of use of the checkout unit assembly according to the first embodiment.

FIG. 9 is a schematic plan view for describing an example of use of the checkout unit assembly 1000 according to the first embodiment.

The checkout unit assembly 1000 according to this embodiment includes the first checkout unit 100 and the second checkout unit 200, each having a user interface portion 300 at one side portion.

The first checkout unit 100 is disposed above the second checkout unit 200 such that the first checkout unit 100 and the second checkout unit 200 overlap when seen in a plan view. In other words, the first checkout unit 100 and the second checkout unit 200 are offset from each other and the first checkout unit 100 is superimposed on the second checkout unit 200.

The user interface portion 300 of the first checkout unit 100 (hereinafter sometimes referred to as a first user interface portion 300A) and the user interface portion 300 of the second checkout unit 200 (hereinafter sometimes referred to as a second user interface portion 300B) are disposed on different side surfaces of the checkout unit assembly 1000.

The checkout unit assembly 1000 has, for example, the base 500 on which the first checkout unit 100 and the second checkout unit 200 are mounted.

The base 500 may be a casing or may be a shelf. In this embodiment, the base 500 is a casing.

Each side surface of the base 500 is also each side surface of the checkout unit assembly 1000.

In this embodiment, the first user interface portion 300A is disposed on a first side surface 510 of the base 500, and the second user interface portion 300B is disposed on a second side surface 520 of the base 500.

Accordingly, a first user to use the first checkout unit 100 can perform checkout by using the first user interface portion 300A in front of the first side face 510 of the base 500. In parallel, a second user to use the second checkout unit 200 can perform checkout by using the second user interface portion 300B in front of the second side face 520 of the base 500.

That is, a single checkout unit assembly 1000 allows parallel execution of the checkout of the first user and the checkout of the second user.

Accordingly, a plurality of checkout can be performed smoothly.

A detailed explanation is as follows.

The checkout unit assembly 1000 is, for example, a semi-self-register (a semi-self-register device) for a purchaser to perform the checkout of the purchased goods of the purchaser, or a cash register (a register device) for a store clerk to perform the checkout of the purchased goods of a purchaser.

If the checkout unit assembly 1000 is a semi-self-register, each of the first checkout unit 100 and the second checkout unit 200 is a money change unit (an automatic money change unit) for a purchaser to perform the checkout of the purchased goods of the purchaser.

If, on the other hand, the checkout unit assembly 1000 is a cash register, each of the first checkout unit 100 and the second checkout unit 200 is a drawer for a store clerk to perform the checkout of the purchased goods of a purchaser.

In this embodiment, the following explanation will be described as the checkout unit assembly 1000 being a semi-self-register.

The user interface portion 300 is a portion where a user using each of the first checkout unit 100 and the second checkout unit 200 for checkout performs various processing such as cash injecting, change receipt, insertion of a payment card (a credit card, a debit card, and so on), and input of a personal identification number of a card.

As shown in FIGS. 1 to 5, the base 500 has, for example, four side surfaces; the first side surface 510, the second side surface 520, a third side surface 530, and a fourth side surface 540.

The first side surface 510 and the second side surface 520 are orthogonal to each other.

The third side surface 530 is a side surface opposite to the first side surface 510.

The fourth side surface 540 is a side surface opposite to the second side surface 520. Accordingly, the fourth side surface 540 is orthogonal to the first side surface 510.

More specifically, the side surface of the base 500 further has a chamfered surface 560 formed by chamfering a corner portion between the first side surface 510 and the second side surface 520. The chamfered surface 560 is disposed, for example, at an angle of 45 degrees with respect to the first side surface 510 and the second side surface 520.

Each of the side surfaces 510, 520, 530, and 540 and the chamfered surface 560 stands vertically, for example.

For this reason, the base 500 is formed, for example, in a pentagonal shape, in a plan view, with oblique cut on one corner of rectangle.

The base 500 has an upper surface 550. As an example, the upper surface 550 is formed horizontally and flatly.

The first user interface portion 300A, which is the user interface portion 300 of the first checkout unit 100, is disposed on the first side surface 510.

On the other hand, the second user interface portion 300B, which is the user interface portion 300 of the second checkout unit 200, is disposed on the second side surface 520.

That is, in this embodiment, the first user interface portion 300A and the second user interface portion 300B are respectively disposed on the first side surface 510 and the second side surface 520 which are orthogonal to each other.

More specifically, for example, a side surface 110 of the first checkout unit 100 at the first user interface portion 300A side and the first side surface 510 of the base 500 that is a side surface on which the first user interface portion 300A of the first checkout unit 100 is disposed are flush with each other.

Similarly, for example, aside surface 210 of the second checkout unit 200 at the second user interface portion 300B side and the second side surface 520 of the base 500 that is a side surface on which the second user interface portion 300B of the second checkout unit 200 is disposed are flush with each other.

This results in a neat appearance of the checkout unit assembly 1000 at the first side surface 510 side and the second side surface 520 side, and enables to prevent a person, a cart, and others moving in the store from colliding with the first checkout unit 100 and the second checkout unit 200.

Here, a portion of the first side surface 510 on which the first checkout unit 100 is disposed and a portion thereof above the portion (hereinafter referred to as a first upper side surface 515) are located deeper (toward the third side surface 530) than another portion (a lower portion) of the first side surface 510.

For this reason, the upper surface of the first user interface portion 300A is exposed to the upper surface side of the checkout unit assembly 1000. That is, a coin receiving opening 311 of the second user interface portion 300B is exposed to the upper surface side of the checkout unit assembly 1000.

Similarly, a portion of the second side surface 520 on which the second checkout unit 200 is disposed and a portion thereof above the portion (hereinafter referred to as a second upper side surface 525) are located deeper (toward the fourth side surface 540) than another portion (a lower portion) of the second side surface 520.

For this reason, the upper surface of the second user interface portion 300B is exposed to the upper surface side of the checkout unit assembly 1000. That is, a coin receiving opening 311 of the second user interface portion 300B is exposed to the upper surface side of the checkout unit assembly 1000.

The first checkout unit 100 has a first coin change device 310A and a first banknote change device 320A.

Similarly, the second checkout unit 200 has a second coin change device 310B and a second banknote change device 320B.

Each of the first coin change device 310A and the second coin change device 310B has the coin receiving opening 311 to accept a coin to be injected for payment, a coin rejecting opening 312 to discharge coins injected into the coin receiving opening 311 and not discriminated in denomination due to scratch, deformation, a recognition error, and so on, and a coin dispensing opening 313 to discharge change of coin.

Each of the first banknote change device 320A and the second banknote change device 320B has a banknote receiving and dispensing opening 321 to accept an injected banknote and discharge change of banknote (also referred to as a change banknote).

The first coin change device 310A and the first banknote change device 320A are disposed side by side.

The first coin change device 310A and the first banknote change device 320A being disposed side by side means that the first coin change device 310A and the first banknote change device 320A are disposed at positions overlapping each other (at least partly overlapping each other) in a height direction.

More preferably, the upper surfaces of the first coin change device 310A and the first banknote change device 320A are disposed at the same level with each other, or the lower surfaces of the first coin change device 310A and the first banknote change device 320A are disposed at the same level with each other.

In this embodiment, the upper surfaces of the first coin change device 310A and the first banknote change device 320A are disposed at the same level with each other.

However, the lower surfaces of the first coin change device 310A and the first banknote change device 320A are disposed at different levels, and specifically, for example, the lower surface of the first banknote change device 320A is disposed higher than the lower surface of the first coin change device 310A.

It is preferable that the first coin change device 310A and the first banknote change device 320A are disposed adjacent to each other in a lateral direction.

Specifically, for example, when the first checkout unit 100 is viewed in the direction of the arrow A of FIG. 1, the first banknote change device 320A is disposed on the right side of the first coin change device 310A.

Similarly, the second coin change device 310B and the second banknote change device 320B are disposed side by side.

That is, the second coin change device 310B and the second banknote change device 320B are disposed at positions overlapping each other in the height direction.

More preferably, the upper surfaces of the second coin change device 310B and the second banknote change device 320B are disposed at the same level with each other, or the lower surfaces of the second coin change device 310B and the second banknote change device 320B are disposed at the same level with each other.

In this embodiment, the upper surfaces of the second coin change device 310B and the second banknote change device 320B are disposed at the same level with each other. However, the lower surfaces of the second coin change device 310B and the second banknote change device 320B are disposed at different levels, and specifically, for example, the lower surface of the second banknote change device 320B is disposed higher than the lower surface of the second coin change device 310B.

It is preferable that the second coin change device 310B and the second banknote change device 320B are disposed adjacent to each other in a lateral direction.

Specifically, for example, when the second checkout unit 200 is viewed in the direction of the arrow B of FIG. 1, the second banknote change device 320B is disposed on the right side of the second coin change device 310B.

The first checkout unit 100 further has a first card payment processor part 330A for payment using a card such as a credit card or a debit card.

Similarly, the second checkout unit 200 further has a second card payment processor part 330B for payment using a card such as a credit card or a debit card.

Each of the first card payment processor part 330A and the second card payment processor part 330B has a card insertion slot 331 to insert a card, and an input operation part 332 such as a numeric keypad accepting an input operation of a personal identification number, for example.

It is preferable that the first card payment processor part 330A is disposed side by side with the first coin change device 310A and the first banknote change device 320A.

Specifically, for example, when the first checkout unit 100 is viewed in the direction of the arrow A of FIG. 1, the first card payment processor part 330A is disposed on the right side of the first banknote change device 320A, as shown in FIG. 2.

Similarly, it is preferable that the second card payment processor part 330B is disposed side by side with the second coin change device 310B and the second banknote change device 320B.

Specifically, for example, when the second checkout unit 200 is viewed in the direction of the arrow B of FIG. 1, the second card payment processor part 330B is disposed on the right side of the second banknote change device 320B, as shown in FIG. 3.

Here, the first user interface portion 300A includes the coin receiving opening 311, the coin rejecting opening 312, and the coin dispensing opening 313 of the first coin change device 310A, the banknote receiving and dispensing opening 321 of the first banknote change device 320A, and the card insertion slot 331 and the input operation part 332 of the first card payment processor part 330A. That is, each of these configurations is disposed on the first side surface 510 of the base 500 (or disposed on the first side surface 510 side).

Similarly, the second user interface portion 300B includes the coin receiving opening 311, the coin rejecting opening 312, and the coin dispensing opening 313 of the second coin change device 310B, the banknote receiving and dispensing opening 321 of the second banknote change device 320B, and the card insertion slot 331 and the input operation part 332 of the second card payment processor part 330B. That is, each of these configurations is disposed on the second side surface 520 of the base 500 (or disposed on the second side surface 520 side).

Each coin receiving opening 311 is disposed on the upper surface of each of the first user interface portion 300A and the second user interface portion 300B and is open upward.

Each coin rejecting opening 312 is disposed on the front side (the side of one side surface) of each of the first user interface portion 300A and the second user interface portion 300B below each of the coin receiving openings 311.

Each coin dispensing opening 313 is disposed next to (on the right side of), for example, each coin rejecting opening 312 on the front side (the side of one side surface) of each of the first user interface portion 300A and the second user interface portion 300B.

Each banknote receiving and dispensing opening 321 is disposed on the front side (the side of one side surface) of each of the first user interface portion 300A and the second user interface portion 300B.

Each card insertion slot 331 is disposed on the front side (the side of one side surface) of each of the first user interface portion 300A and the second user interface portion 300B. Each input operation part 332 is disposed facing upward above each card insertion slot 331, for example.

The checkout unit assembly 1000 further has a first display 700A for the first user to use the first checkout unit 100, and a second display 700B for the second user to use the second checkout unit 200. The first display 700A and the second display 700B are mounted on the base 500.

More specifically, for example, the first display 700A is placed on the upper surface 550 at the first side surface 510 side area, and the second display 700B is placed on the upper surface 550 at the second side surface 520 side area.

The first display 700A is disposed such that, for example, a display screen thereof is parallel to the first side surface 510.

The second display 700B is disposed such that, for example, a display screen thereof is parallel to the second side surface 520.

The upper surface 550 is horizontal, and therefore, the first display 700A and the second display 700B are disposed at the same level with each other.

The first display 700A and the second display 700B perform various displays.

The first display 700A and the second display 700B can be, for example, touch panels. In this case, the first user and the second user can give an instruction on the start of the checkout, select a checkout method (for example, whether to make payment with cash, a credit card, or a debit card), or call a store clerk out, for example, through a touch operation on the first display 700A and the second display 700B.

The checkout unit assembly 1000 further has a first receipt printer 800A for the first user to use the first checkout unit 100, and a second receipt printer 800B for the second user to use the second checkout unit 200.

The first receipt printer 800A prints and outputs a receipt when the first user has finished the payment.

Similarly, the second receipt printer 800B prints and outputs a receipt when the second user has finished the payment.

The first receipt printer 800A is placed, for example, on the upper surface 550 at the first side surface 510 side area, and more specifically, for example, the first receipt printer 800A is disposed next to (on, for example, the left side of) the first display 700A when the checkout unit assembly 1000 is viewed in the direction of the arrow A of FIG. 1.

Similarly, the second receipt printer 800B is placed, for example, on the upper surface 550 at the second side surface 520 side area, and more specifically, for example, the second receipt printer 800B is disposed next to (on, for example, the left side of) the second display 700B when the checkout unit assembly 1000 is viewed in the direction of the arrow B of FIG. 1.

The checkout unit assembly 1000 further has a first calling lamp part 900A for the first user to use the first checkout unit 100, and a second calling lamp part 900B for the second user to use the second checkout unit 200.

The configuration of each of the first calling lamp part 900A and the second calling lamp part 900B is not particularly limited. However, as an example, each of the first calling lamp part 900A and the second calling lamp part 900B has a columnar shape standing on the base 500 (standing on the upper surface 550, for example) and has a light emitting display part such as an LED lamp at an upper end portion thereof.

For example, the first calling lamp part 900A stands on the upper surface 550 at the first side surface 510 side area, and the second calling lamp part 900B stands on the upper surface 550 at the second side surface 520 side area.

The light emitting display part of the first calling lamp part 900A emits light, for example, when an error related to the checkout by the first user (for example, jam of a coin or a banknote, lack of change, paper jam of a receipt) occurs, or when the first user operates the first display 700A as a touch panel to call a store clerk out.

Similarly, the light emitting display part of the second calling lamp part 900B emits light, for example, when an error related to the checkout by the second user occurs, or when the second user operates the second display 700B as a touch panel to call a store clerk out.

The first display 700A, the first receipt printer 800A, and the first calling lamp part 900A are disposed at positions above the first checkout unit 100.

On the other hand, the second display 700B, the second receipt printer 800B, and the second calling lamp part 900B are disposed at positions above the first checkout unit 100 and above the second checkout unit 200.

The checkout unit assembly 1000 further has a blindfold board 400. The blindfold board 400 screens (visually screens) a region where the first user interface portion 300A of the first checkout unit 100 is disposed and a region where the second user interface portion 300B of the second checkout unit 200 is disposed from one another.

For this reason, the first user and the second user can perform the checkout without paying attention to each other's eyes. In particular, it is not necessary to concern with other's eyes when inputting a personal identification number for the checkout using a credit card, for example.

More specifically, for example, the blindfold board 400 partitions an area 1100A where the first display 700A, the first receipt printer 800A, and the first calling lamp part 900A are disposed, and an area 1100B where the second display 700B, the second receipt printer 800B and the second calling lamp part 900B are disposed (See FIG. 6).

The blindfold board 400, for example, stands upwardly (for example, vertically standing) from the upper surface of the base 500. It is preferable that the blindfold board 400 extends from the corner portion between the first upper side surface 515 and the second upper side surface 525 toward the chamfered surface 560 side, as shown in FIG. 1.

The blindfold board 400 may be an opaque plate member or may be a translucent or transparent plate member. However, when the blindfold board 400 is transparent, it is preferable that it is colored.

As described above, in this embodiment, the first side surface 510 of the base 500 that is the side surface on which the first user interface portion 300A of the first checkout unit 100 is disposed and the second side surface 520 of the base 500 that is the side surface on which the second user interface portion 300B of the second checkout unit 200 is disposed are orthogonal to each other.

In this case, it is preferable that the blindfold board 400 is oriented to intersect both the first side surface 510 and the second side surface 520, as shown in FIGS. 1 and 6.

The blindfold board 400 is preferably disposed at an angle of 30 degrees or more and 60 degrees or less with respect to the first side surface 510 and further preferably disposed at an angle of 45 degrees with respect to both the first side surface 510 and the second side surface 520.

The checkout unit assembly 1000 further has a first loading table 600A for the first user to use the first user interface portion 300A of the first checkout unit 100 and a second loading table 600B for the second user to use the second user interface portion 300B of the second checkout unit 200. The first loading table 600A and the second loading table 600B are provided to the base 500.

Each of the first loading table 600A and the second loading table 600B is formed, for example, in a plate shape, and one end portion thereof is fixed to the side surface of the base 500, whereby the upper surface thereof is horizontally disposed and the other end side protrudes outward from the side surface of the base 500.

More specifically, for example, one end portion of the first loading table 600A is fixed to the third side surface 530 and the other end side protrudes to the opposite of the second side surface 520 relative to the third side surface 530.

On the other hand, for example, one end portion of the second loading table 600B is fixed to the fourth side surface 540 and the other end side protrudes to the opposite of the first side surface 510 relative to the fourth side surface 540.

The planar shape of each of the first loading table 600A and the second loading table 600B is not particularly limited. However, it is preferable that the planar shape is a rectangular shape (for example, a rectangular shape having rounded corners).

Baggage such as a shopping basket can be placed on each of the first loading table 600A and the second loading table 600B.

In this embodiment, the first loading table 600A and the second loading table 600B are disposed, for example, at the same level with each other.

Here, as shown in FIG. 4, the third side surface 530 has a first opening 531 formed thereon that communicates with a placement region of the first checkout unit 100 inside the base 500, and a first lid part 532 provided thereto that is removably attached to the third side surface 530 and closes the first opening 531.

Cables (not shown) are drawn out from the back side of the first checkout unit 100, thereby to perform work such as wiring of the cables through the first opening 531 with the first lid part 532 being removed from the third side surface 530 to open the first opening 531. For example, the cables of the first checkout unit 100 can be drawn onto the upper surface 550.

Similarly, as shown in FIG. 5, the fourth side surface 540 has a second opening 541 formed thereon that communicates with a placement region of the second checkout unit 200 inside the base 500, and a second lid part 542 provided thereto that is removably attached to the fourth side surface 540 and closes the second opening 541.

Cables (not shown) are drawn out from the back side of the second checkout unit 200, and thereby to perform work such as wiring of the cables through the second opening 541 with the second lid part 542 being removed from the fourth side surface 540 to open the second opening 541. For example, the cables of the second checkout unit 200 can be drawn onto the upper surface 550.

More specifically, for example, the first opening 531 of the third side surface 530 is formed above the second loading table 600B (FIG. 4). This can prevent the second loading table 600B from interfering with various work through the first opening 531.

Similarly, for example, the second opening 541 of the fourth side surface 540 is formed above the first loading table 600A (FIG. 5). This can prevent the first loading table 600A from interfering with various work through the second opening 541.

It is preferable that the first checkout unit 100 and the second checkout unit 200 are the same with respect to one another. That is, it is preferable that the first checkout unit 100 and the second checkout unit 200 have the same function with respect to one another and are formed in the same shape and dimensions.

As shown in FIG. 7, each of the first checkout unit 100 and the second checkout unit 200 is formed in a flat rectangular parallelepiped shape, for example.

The first checkout unit 100 and the second checkout unit 200 are oriented such that the side surface 110 of the first checkout unit 100 and the side surface 210 of the second checkout unit 200 are orthogonal to each other.

For example, the first user interface portion 300A, which is located at one side portion of the first checkout unit 100, strays (protrudes) from the space above the second checkout unit 200 toward the first side surface 510 (that is, toward the side surface 110).

Similarly, the second user interface portion 300B, which is located at one side portion of the second checkout unit 200, strays (protrudes) from the space below the first checkout unit 100 toward the second side surface 520 (that is, toward the side surface 210).

Next, the base 500 for a checkout unit assembly according to this embodiment will be described using FIG. 8.

The base 500 has the first side surface 510, the second side surface 520, the third side surface 530, the fourth side surface 540, the upper surface 550, the chamfered surface 560, the first upper side surface 515, and the second upper side surface 525 described above.

The first checkout unit 100 and the second checkout unit 200 can be mounted on the base 500.

Each of a plurality of side surfaces of the base 500 has an insertion hole formed thereon to insert each of the first checkout unit 100 and the second checkout unit 200. That is, an insertion hole 511 is formed on the first side surface 510, and an insertion hole 521 is formed on the second side surface 520.

For example, the back side of the first checkout unit 100 is horizontally inserted into the insertion hole 511 and the first checkout unit 100 is pushed to a predetermined depth, thereby to mount the first checkout unit 100 the base 500, as shown in FIG. 1.

Similarly, the back side of the second checkout unit 200 is horizontally inserted into the insertion hole 521 and the second checkout unit 200 is pushed to a predetermined depth, thereby to mount the second checkout unit 200 on the base 500, as shown in FIG. 1.

As the first checkout unit 100 is inserted into the insertion hole 511 of the first side surface 510 and the second checkout unit 200 is inserted into the insertion hole 521 of the second side surface 520, the first checkout unit 100 and the second checkout unit 200 overlap when seen in a plan view, the first checkout unit 100 is disposed above the second checkout unit 200, and the first user interface portion 300A of the first checkout unit 100 and the second user interface portion 300B of the second checkout unit 200 are disposed on the different side surfaces (for example, the first side surface 510 and the second side surface 520 which are orthogonal to each other) of the base 500 (See FIG. 1).

The first checkout unit 100 and the second checkout unit 200 are removable from the base 500.

Accordingly, the first checkout unit 100 and the second checkout unit 200 are separated from the base 500 to transport the first checkout unit 100, the second checkout unit 200 and the base 500 to the installation place of the checkout unit assembly 1000, thereby reducing a load of transportation work.

For example, business operators originally owning the first checkout unit 100 and the second checkout unit 200 can assemble the checkout unit assembly 1000, if only the base 500 is sold to them, by effectively utilizing the first checkout unit 100 and the second checkout unit 200 originally owned by the business operators.

The checkout unit assembly 1000 can be assembled by mounting the first checkout unit 100 and the second checkout unit 200 on the base 500 and mounting the first display 700A, the second display 700B, the first receipt printer 800A, the second receipt printer 800B, the first calling lamp part 900A, the second calling lamp part 900B, the blindfold board 400, and others on the base 500.

For example, a slit 555 for fixing the blindfold board 400 by inserting a lower end portion of the blindfold board 400 therein may be formed on, for example, the upper surface 550 of the base 500.

An insertion and fixing hole (not shown) for inserting a lower end portion of each of the first calling lamp part 900A and the second calling lamp part 900B in order to raise each of the first calling lamp part 900A and the second calling lamp part 900B may be formed on the upper surface 550 of the base 500.

FIG. 8 shows a state where the first loading table 600A and the second loading table 600B are fixed to the base 500. However, the first loading table 600A and the second loading table 600B may be removable from the base 500. Thus, the first loading table 600A and the second loading table 600B can be removed from the base 500 when, for example, the base 500 is transported, thereby suppressing bulkiness in the transportation, for example.

The base 500 has, for example, an insertion hole lid part 512 and an insertion hole lid part 522.

The insertion hole lid part 512 is removably attached to the first upper side surface 515 of the first side surface 510 and is capable of closing the insertion hole 511.

Similarly, the insertion hole lid part 522 is removably attached to the second upper side surface 525 of the second side surface 520 and is capable of closing the insertion hole 521.

The work of mounting the first checkout unit 100 and the second checkout unit 200 on the base 500 is performed with the insertion hole lid part 512 and the insertion hole lid part 522 being removed from the base 500.

On the other hand, when the base 500 is stored or transported, the insertion hole lid part 512 and the insertion hole lid part 522 are mounted on the base 500, thereby enabling prevention of infiltration of foreign matter such as dust into the insertion hole 511 and the insertion hole 521.

Next, an example of use of the checkout unit assembly 1000 will be described using FIG. 9.

In the example shown in FIG. 9, two goods registration tables 3000 are disposed in parallel with each other in a selling area of a store, and store clerks 10 and 20 perform the customer service work between the goods registration tables 3000.

A goods registration device 3100 for the store clerk to perform registration processing of purchased goods of a purchaser is placed on each of the goods registration tables 3000.

Each of the goods registration tables 3000 is long in one direction, and the checkout unit assembly 1000 is disposed at one end side of each goods registration table 3000 in a longitudinal direction thereof.

A packing table 3200 for the purchaser to pack the purchased goods is disposed opposite to a region where the two goods registration tables 3000 is located, relative to a region where the two checkout unit assemblies 1000 is located.

Identification numbers are assigned to the first checkout unit 100 and the second checkout unit 200 of each of the checkout unit assemblies 1000.

Here, the identification numbers of the first checkout unit 100 and the second checkout unit 200 of the checkout unit assembly 1000 on the left side in FIG. 9 are No. 1 and No. 2, respectively, and the identification numbers of the first checkout unit 100 and the second checkout unit 200 of the checkout unit assembly 1000 on the right side in FIG. 9 are No. 3 and No. 4, respectively.

The identification number of each of these four checkout units is displayed, for example, on a sign plate (not shown) provided to stand at a corresponding position on the upper surface 550 of the corresponding checkout unit assembly 1000, thereby to facilitate easy recognition by the purchaser.

The store clerk 10 registers the purchased goods by handling the goods registration device 3100 on one goods registration table 3000, and the store clerk 20 registers the purchased goods by handling the goods registration device 3100 on another goods registration table 3000.

If the store clerk 10 finishes the registration of the purchased goods of a purchaser 30, the store clerk 10 transmits goods registration information of the purchaser 30 to an available checkout unit (for example, the first checkout unit 100 having the identification number of No. 1) and tells the identification number of the checkout unit (for example, No. 1) to the purchaser 30.

At this time, the store clerk 10 carries, for example, a shopping basket (not shown) containing the purchased goods of the purchaser 30, to the loading table corresponding to the checkout unit (for example, the first loading table 600A).

Thereafter, the purchaser 30 performs checkout at the checkout unit having the identification number told by the store clerk 10.

The checkout is started, for example, with a touch operation of the purchaser 30 on a "checkout start button" displayed on the first display 700A as a touch panel.

Subsequently, for example, a selection screen for payment method is displayed on the first display 700A, allowing to select payment with cash, payment with a credit card, payment with a debit card, and so on.

If the purchaser 30 selects the payment with cash, the first coin change device 310A and the first banknote change device 320A goes into a wait state of receiving cash.

Subsequently, if the purchaser 30 injects cash into at least one of the coin receiving opening 311 and the banknote receiving and dispensing opening 321, the first checkout unit 100 executes counting processing of the injected cash and displays the counted amount and a "amount confirmation button" on the first display 700A.

Subsequently, if the purchaser 30 performs a touch operation on the "amount confirmation button", the first checkout unit 100 executes calculation processing of change and pays out change to the coin dispensing opening 313 and the banknote receiving and dispensing opening 321.

The first checkout unit 100 also causes the first receipt printer 800A to execute receipt printing processing, and in response to this, the first receipt printer 800A prints and outputs a receipt.

Thereafter, the purchaser 30 carries the shopping basket containing the purchased goods to the packing table 3200 and packs the purchased goods.

Here, as shown by the traffic line of the store clerk 10 indicated by the broken line in FIG. 9, the store clerk 10 can smoothly move to a location accessible to advise how to handle the checkout unit assembly 1000 to a purchaser using the first checkout unit 100 of the checkout unit assembly 1000 on the left side, a purchaser using the second checkout unit 200 of the checkout unit assembly 1000 on the left side, and a purchaser using the first checkout unit 100 of the checkout unit assembly 1000 on the right side.

Similarly, the store clerk 20 can smoothly move to a location accessible to advise how to handle the checkout unit assembly 1000 to a purchaser using the second checkout unit 200 of the checkout unit assembly 1000 on the left side, a purchaser using the first checkout unit 100 of the checkout unit assembly 1000 on the right side, and a purchaser using the second checkout unit 200 of the checkout unit assembly 1000 on the right side.

According to the first embodiment as described above, the first checkout unit 100 is disposed above the second checkout unit 200 such that the first checkout unit 100 and the second checkout unit 200 overlap when seen in a plan view, thereby allowing to save an equipment space for two parallel checkout processes.

This allows for more checkout in parallel in a limited installation space (planar space) in the store.

Here, the first user interface portion 300A of the first checkout unit 100 and the second user interface portion 300B of the second checkout unit 200 are disposed on different side surfaces of the checkout unit assembly 1000 (for example, different side surfaces of the base 500), thereby allowing to suppress interference between the first user using the first user interface portion 300A and the second user using the second user interface portion 300B. This allows smooth checkout by the first user and the second user while preserving their privacy.

If the first checkout unit 100 has the first coin change device 310A and the first banknote change device 320A and the second checkout unit 200 has the second coin change device 310B and the second banknote change device 320B, the first checkout unit 100 and the second checkout unit 200 become bulky.

In such a case, the first checkout unit 100 is disposed above the second checkout unit 200 such that the first checkout unit 100 and the second checkout unit 200 overlap when seen in a plan view, thereby to particularly enhance the effect of reducing the installation space (planar space) of two checkout units; the first checkout unit 100 and the second checkout unit 200.

The first coin change device 310A and the first banknote change device 320A are disposed side by side, thereby allowing for an operation on the first coin change device 310A and an operation on the first banknote change device 320A at the same level, thus facilitating the checkout.

Similarly, the second coin change device 310B and the second banknote change device 320B are disposed side by side, thereby allowing for an operation on the second coin change device 310B and an operation on the second banknote change device 320B at the same level, thus facilitating the checkout.

The checkout unit assembly 1000 has the blindfold board 400 screening a region where the first user interface portion 300A of the first checkout unit 100 is disposed and a region where the second user interface portion 300B of the second checkout unit 200 is disposed from one another. Therefore, the first user and the second user can perform the checkout without paying attention to each other's eyes. In particular, it is not necessary to concern with other's eyes when inputting a personal identification number for the checkout using a credit card, for example.

In this embodiment, the first side surface 510 of the base 500 that is the side surface on which the first user interface portion 300A of the first checkout unit 100 is disposed and the second side surface 520 of the base 500 that is the side surface on which the second user interface portion 300B of the second checkout unit 200 is disposed are orthogonal to each other. In this case, the blindfold board 400 is oriented to intersect both the first side surface 510 and the second side surface 520, thereby allowing to effectively screen the area where the first user interface portion 300A is disposed and the area where the second user interface portion 300B is disposed from one another by a single blindfold board 400.

The side surface 110 of the first checkout unit 100 at the user interface portion 300A side and the first side surface 510 of the base 500 that is the side surface on which the user interface portion 300A of the first checkout unit 100 is disposed are flush with each other. This results in a neat appearance of the first side surface 510 side in the checkout unit assembly 1000, and enables to prevent a person, a cart, and others moving in the store from colliding with the first checkout unit 100.

Similarly, the side surface 210 of the second checkout unit 200 at the first user interface portion 300A side and the second side surface 520 of the base 500 that is the side surface on which the second user interface portion 300B of the second checkout unit 200 is disposed are flush with each other. This results in a neat appearance of the second side surface 520 side in the checkout unit assembly 1000, and enables to prevent a person, a cart, and others moving in the store from colliding with the second checkout unit 200.

The first loading table 600A for the first user to use the first user interface portion 300A of the first checkout unit 100 and the second loading table 600B for the second user to use the second user interface portion 300B of the second checkout unit 200 are provided to the base 500. This allows the first user and the second user to perform the checkout while placing their baggage on respective dedicated loading tables, thereby enabling prevention of switching the baggage, for example.

If the first loading table 600A and the second loading table 600B are disposed at the same level with each other, a work load to place handled baggage or baggage placed on a floor onto each loading table can level out between each user.

It is also preferable that the first loading table 600A corresponding to the first user interface portion 300A disposed at a higher level is disposed higher than the second loading table 600B corresponding to the second user interface portion 300B disposed at a lower level. In such a case, the distance between each user interface portion 300 and each of the loading tables 600A and 600B becomes short, thereby facilitating each user's monitoring of the baggage on each of the loading stages 600A and 600B even when each user interface portion 300 is handled.

The first display 700A for the first user to use the first checkout unit 100 and the second display 700B for the second user to use the second checkout unit 200 are mounted on the base 500, thereby enabling the first user and the second user to perform the checkout by using the respective dedicated displays.

If the first display 700A and the second display 700B are disposed at the same level with each other, the posture (standing posture) when viewing the first display 700A and the posture (standing posture) when viewing the second display 700B can be made to be equal to each other.

According to the base 500 of this embodiment, the checkout unit assembly 1000 can be constructed (assembled) with ease by inserting the first checkout unit 100 and the second checkout unit 200 into the insertion holes 511 and 521 respectively formed in a plurality of side surfaces. That is, it is possible to easily construct the checkout unit assembly 1000 which allows for more checkout in parallel in a limited installation space.

The base 500 has the plurality of insertion hole lid parts 512 and 522 that are each removably attached to a plurality of side surfaces of the base 500 and are capable of closing the insertion holes 511 and 521. The insertion holes 511 and 521 can be closed by the insertion hole lid parts 512 and 522 when, for example, the base 500 is stored or transported, thereby enabling prevention of infiltration of foreign matter such as dust into the insertion holes 511 and 521.

[Second Embodiment]

Figure 10:
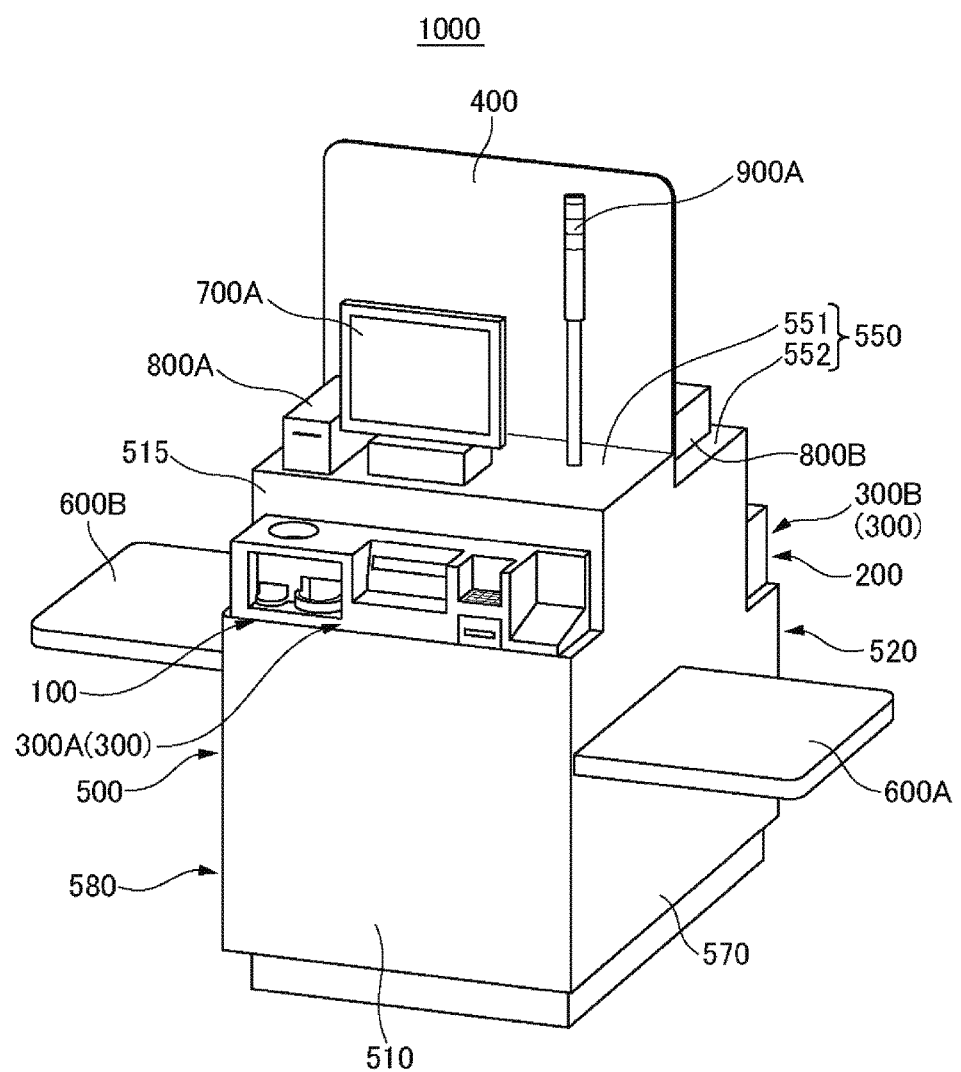
FIG. 10 is a perspective view of a checkout unit assembly according to a second embodiment as viewed from the front side.

FIG. 10 is a perspective view of the checkout unit assembly 1000 according to a second embodiment as viewed from the front side.

Figure 11:
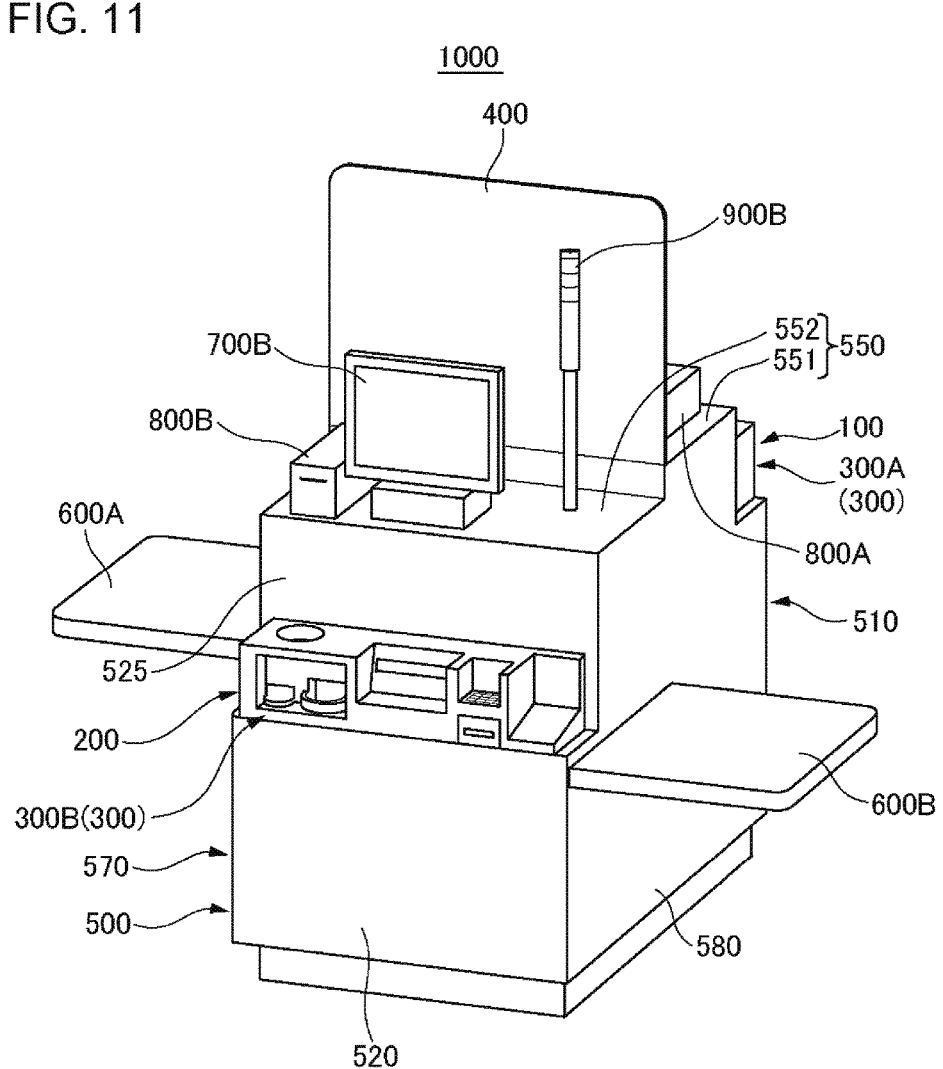
FIG. 11 is a perspective view of the checkout unit assembly according to the second embodiment as viewed from the back side.

FIG. 11 is a perspective view of the checkout unit assembly 1000 according to the second embodiment as viewed from the back side.

Figure 12:
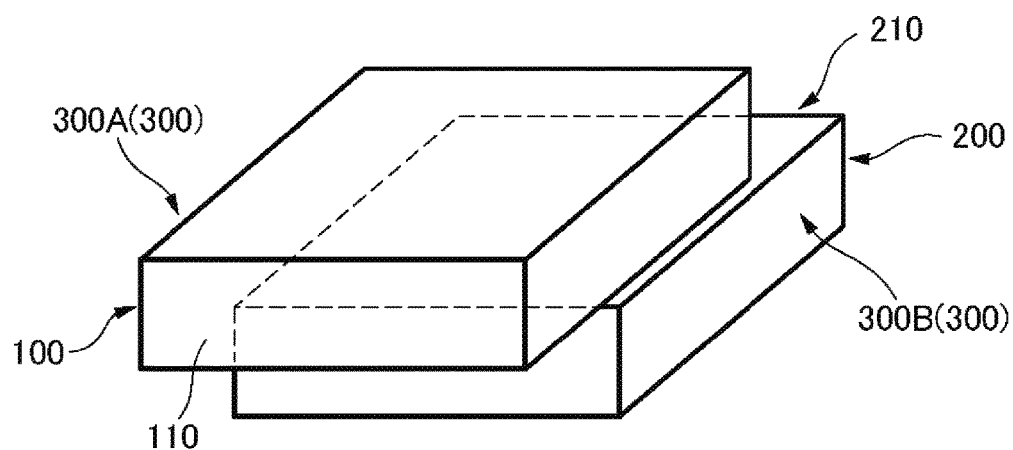
FIG. 12 is a schematic perspective view showing the disposition of the first checkout unit and the second checkout unit in the checkout unit assembly according to the second embodiment.

FIG. 12 is a schematic perspective view showing the disposition of the first checkout unit 100 and the second checkout unit 200 in the checkout unit assembly 1000 according to the second embodiment.

Figure 13:
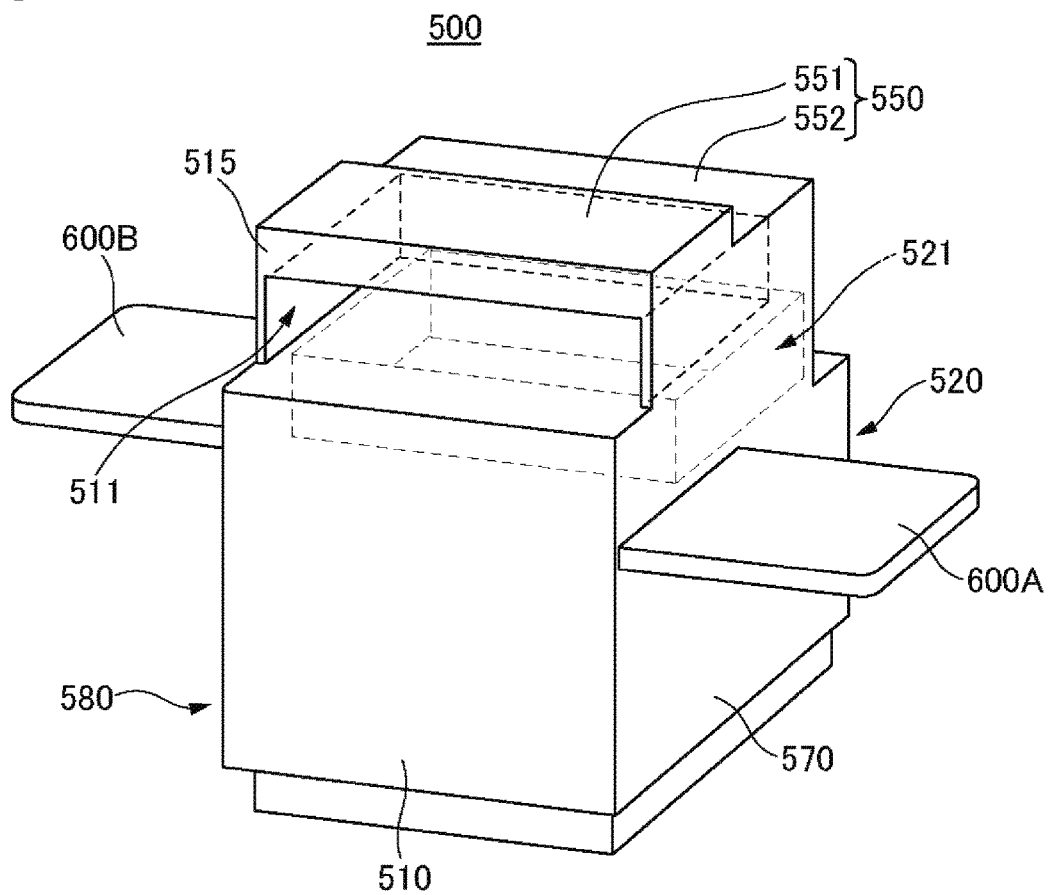
FIG. 13 is a perspective view of a base for a checkout unit assembly according to the second embodiment.

FIG. 13 is a perspective view of the base 500 for a checkout unit assembly according to the second embodiment.

The checkout unit assembly 1000 according to the second embodiment is different from the checkout unit assembly 1000 according to the first embodiment in respects which will be described below and is configured to be equal to the checkout unit assembly 1000 according to the first embodiment in the other respects.

In the first embodiment described above, an example in which the first user interface portion 300A and the second user interface portion 300B are respectively disposed on the first side surface 510 and the second side surface 520 which are orthogonal to each other has be described.

In contrast, in this embodiment, as shown in FIGS. 10 and 11, the first user interface portion 300A and the second user interface portion 300B are respectively disposed on the first side surface 510 and the second side surface 520 which are opposite to each other.

In this embodiment, the base 500 is formed, for example, in a rectangular shape when seen in a plan view and has the first side surface 510 and the second side surface 520 which are opposite to each other, and a pair of side surfaces 570 and 580 located between the first side surface 510 and the second side surface 520.

The side surface 570 and the side surface 580 are made to be opposite to each other, for example.

In this embodiment, the upper surface 550 includes a high step part 551 and a low step part 552 disposed at a lower step than the high step part 551. The high step part 551 is a half of the upper surface 550 at the first side surface 510 side, and the low step part 552 is a half of the upper surface 550 at the second side surface 520 side.

The first display 700A, the first receipt printer 800A, and the first calling lamp part 900A are disposed at the high step part 551, and the second display 700B, the second receipt printer 800B, and the second calling lamp part 900B are disposed at the low step part 552.

Therefore, the first display 700A is disposed higher than the second display 700B.

The blindfold board 400 is disposed at the boundary between the high step part 551 and the low step part 552 when seen in a plan view. The blindfold board 400 is disposed, for example, parallel to the first side surface 510 and the second side surface 520.

For example, one end portion of the first loading table 600A is fixed to the side surface 570, and the other end side protrudes to the opposite to the side surface 580 side relative to the side surface 570.

Similarly, for example one end portion of the second loading table 600B is fixed to the side surface 580, and the other end side protrudes to opposite to the side surface 570 side relative to the side surface 580.

As can be seen from the perspective view shown in FIG. 12, the first checkout unit 100 and the second checkout unit 200 are disposed such that the side surface 110 and the side surface 210 are parallel to each other and opposite to each other.

As shown in FIG. 13, also in this embodiment, the insertion hole 511 is formed on the first side surface 510 of the base 500. The insertion hole 521 (not shown) is formed on the second side surface 520.

In this embodiment, an opening direction of the insertion hole 511 and an opening direction of the insertion hole 521 are opposite directions.

Also in this embodiment, the back side of the first checkout unit 100 is horizontally inserted into the insertion hole 511 and the first checkout unit 100 is pushed to a predetermined depth, thereby to mount the first checkout unit 100 on the base 500, as shown in FIG. 10.

Similarly, the back side of the second checkout unit 200 is horizontally inserted into the insertion hole 521 and the second checkout unit 200 is pushed to a predetermined depth, thereby to mount the second checkout unit 200 on the base 500, as shown in FIG. 11.

Also with the second embodiment as described above, the same effects as those of the first embodiment can be obtained.

In this embodiment, although it also depends on the shapes of the first checkout unit 100 and the second checkout unit 200, it is possible to further save a space for the checkout unit assembly 1000 (reduce the planar space) than in the first embodiment.

For example, if each of the first checkout unit 100 and the second checkout unit 200 has a rectangular parallelepiped shape long in a depth direction, both end positions of the first checkout unit 100 in the width direction are aligned with both end positions of the second checkout unit 200 in the width direction when seen in a plan view, thereby allowing the width dimension of the planar space occupied by the first checkout unit 100 and the second checkout unit 200 to be the width dimension of a single checkout unit.

[Third Embodiment]

In the first embodiment described above, an example in which the first opening 531 (FIG. 4) of the third side surface 530 and the second opening 541 (FIG. 5) of the fourth side surface 540 are for work such as wiring of the cables on the back sides of the first checkout unit 100 and the second checkout unit 200 respectively has been described.

However, the first opening 531 and the second opening 541 can also be used as insertion holes to insert the first checkout unit 100 and the second checkout unit 200 respectively.

That is, a plurality of side surfaces of the base 500 includes four side surfaces; the first side surface 510, the second side surface 520 orthogonal to the first side surface 510, the third side surface 530 opposite to the first side surface 510, and the fourth side surface 540 opposite to the second side surface 520, and a insertion hole may be formed on each of the four side surfaces.

In this case, each of the first lid part 532 (FIG. 4) and the second lid part 542 (FIG. 5) can be regarded as an insertion hole lid part.

In this manner, if the insertion hole is formed on each of the four side surfaces of the base 500, the checkout unit assembly 1000 can be assembled by inserting the first checkout unit 100 and the second checkout unit 200 into places where the insertion hole lid parts are removed to open the insertion holes.

Accordingly, it is possible to dispose each user interface portion 300 on a favorite side surface among the four side surfaces of the base 500 according to, for example, the circumstances of an installation space in a store or the concept of the layout of the user interface portions 300 of the first checkout unit 100 and the second checkout unit 200 for each store.

In each of the embodiments described above, another checkout unit other than the first checkout unit 100 and the second checkout unit 200 may be disposed between the first checkout unit 100 and the second checkout unit 200 (at the position between the first checkout unit 100 and the second checkout unit 200 in the height direction).

Similarly, another checkout unit may be disposed also higher than the first checkout unit 100 or lower than the second checkout unit 200.

Another checkout unit as referred to herein may be, for example, a checkout unit used for the checkout by the first user using the first checkout unit 100, a checkout unit used for the checkout by the second user using the second checkout unit 200, or a checkout unit used for the checkout by a third user other than the first user and the second user.

As a specific example, for example, the first checkout unit 100 may have one change device of the first coin change device 310A and the first banknote change device 320A and may not have the other change device, and the other change device may be disposed between the first checkout unit 100 and the second checkout unit 200, above the first checkout unit 100, or below the second checkout unit 200. Similarly, the second checkout unit 200 may have one change device of the second coin change device 310B and the second banknote change device 320B and may not have the other change device, and the other change device may be disposed between the first checkout unit 100 and the second checkout unit 200, below the second checkout unit 200, or above the first checkout unit 100.

In each of the embodiments described above, an example in which each of the first checkout unit 100 and the second checkout unit 200 has the coin change device, the banknote change device, and the card payment processor part has been described.

However, each of the first checkout unit 100 and the second checkout unit 200 may have other configuration provided that it is possible for a purchaser to perform the checkout of the purchased goods of the purchaser.

For example, each of the first checkout unit 100 and the second checkout unit 200 may have the coin change device and the banknote change device but may not have the card payment processor part, thereby permitting only the cash checkout.

If only cash checkout is permitted, each of the first checkout unit 100 and the second checkout unit 200 may have only one of the coin change device and the banknote change device.

Alternatively, each of the first checkout unit 100 and the second checkout unit 200 may have the card payment processor part but may not have the coin change device and the banknote change device, thereby permitting only the credit card checkout.

Alternatively, each of the first checkout unit 100 and the second checkout unit 200 may have an electronic money payment processor part for executing electronic money checkout, thereby permitting electronic money checkout. In this case, each of the first checkout unit 100 and the second checkout unit 200 may have the electronic money payment processor part but may not have the coin change device and the banknote change device or the card payment processor part, thereby permitting only the electronic money checkout.

The user interface portion 300 permitting the electronic money checkout includes a reading device for reading information of a storage medium (for example, an IC card) storing information such as balance of the electronic money. A user performs processing of causing the reading device to read the information stored in the storage medium, by bringing the storage medium into contact with the reading device or holding the storage medium over the reading device.

In each of the embodiments described above, an example in which the checkout unit assembly 1000 is a semi-self-register and each of the first checkout unit 100 and the second checkout unit 200 is a money change unit for a purchaser to perform the checkout of the purchased goods of the purchaser has been mainly describe.

However, as described above, the checkout unit assembly 1000 may be a register (a register device) for a store clerk to perform the checkout of the purchased goods of a purchaser. In this case, each of the first checkout unit 100 and the second checkout unit 200 is a drawer for a store clerk to perform the checkout of the purchased goods of a purchaser.

If the first checkout unit 100 and the second checkout unit 200 is a drawer, each of the first checkout unit 100 and the second checkout unit 200 projects toward the front side (the side of the side surface 110 or 210) by store clerk operation, and returns to the original position to be latched by the store clerk pressing the side surface 110 or 210. The user interface portion 300 in this case includes at least the side surface 110 or 210 for the store clerk to press to return the projected first checkout unit 100 and second checkout unit 200 to the original position.

In each of the embodiments described above, an example in which the checkout unit assembly 1000 is a semi-self-register has been mainly described. However, the checkout unit assembly 1000 may be a full-self-register configured such that a purchaser performs registration processing of purchased goods as well. In this case, for example, a registration device such as a bar code reader, for performing the registration processing of purchased goods, is added to each of the first checkout unit 100 and the second checkout unit 200 as well.

This application claims the right of priority based on Japanese Patent Application No. 2015-025353 filed on Feb. 12, 2015, the entire disclosure of which is incorporated herein by reference.

The invention claimed is:

1. A checkout unit assembly comprising:
a first checkout unit and a second checkout unit each having a user interface portion at one side portion;
a base on which the first checkout unit and the second checkout unit are mounted,
wherein the first checkout unit is disposed above the second checkout unit such that the first checkout unit and the second checkout unit overlap when seen in a plan view,
the user interface portion of the first checkout unit and the user interface portion of the second checkout unit are disposed on different side surfaces, wherein
a first loading table is provided to the base, wherein the first loading table is for a first user to use the user interface portion of the first checkout unit, and
a second loading table is provided to the base, wherein the second loading table is for a second user to use the user interface portion of the second checkout unit.

2. A checkout unit assembly comprising:
a first checkout unit and a second checkout unit each having a user interface portion at one side portion;
a base on which the first checkout unit and the second checkout unit are mounted,
wherein the first checkout unit is disposed above the second checkout unit such that the first checkout unit and the second checkout unit overlap when seen in a plan view,
the user interface portion of the first checkout unit and the user interface portion of the second checkout unit are disposed on different side surfaces,
a first display is mounted on the base, wherein the first display is for a first user to use the first checkout unit, and a second display is mounted on the base, wherein the second display is for a second user to use the second checkout unit.

3. The checkout unit assembly according to claim 2, wherein the first display and the second display are disposed at the same level with each other.

4. The checkout unit assembly according to claim 2, wherein the first display is disposed higher than the second display.

5. A base for a checkout unit assembly, wherein a first checkout unit and a second checkout unit each having a user interface portion at one side portion are to be mounted on the base, the base comprising:
an insertion hole to insert each of the first checkout unit and the second checkout unit, the insertion hole being formed on each of a plurality of side surfaces of the base,
wherein, as the first checkout unit is inserted into the insertion hole on one side surface of the base and the second checkout unit is inserted into the insertion hole of another side surface of the base,
the first checkout unit and the second checkout unit are overlapped when seen in a plan view, the first checkout unit is disposed above the second checkout unit, and the user interface portion of the first checkout unit and the user interface portion of the second checkout unit are disposed on different side surfaces of the base, and
the plurality of side surfaces of the base includes four side surfaces which are a first side surface, a second side surface orthogonal to the first side surface, a third side surface opposite to the first side surface, and a fourth side surface opposite to the second side surface, and
the insertion hole is formed on each of the four side surfaces.

6. The base for a checkout unit assembly according to claim 5, further comprising:
a plurality of insertion hole lid parts each removably attached to the plurality of side surfaces of the base and capable of closing the insertion holes.

7. The checkout unit assembly according to claim 2, wherein the first checkout unit comprises a first coin change device and a first banknote change device, and
the second checkout unit comprises a second coin change device and a second banknote change device.

8. The checkout unit assembly according to claim 7, wherein the first coin change device and the first banknote change device are disposed side by side, and
the second coin change device and the second banknote change device are disposed side by side.

9. The checkout unit assembly according to claim 2, wherein each of the first checkout unit and the second checkout unit is a money change unit for a purchaser to perform checkout of purchased goods of the purchaser.

10. The checkout unit assembly according to claim 2, wherein each of the first checkout unit and the second checkout unit is a drawer for a store clerk to perform checkout of purchased goods of a purchaser.

11. The checkout unit assembly according to claim 2, further comprising:
a blindfold board screening a region where the user interface portion of the first checkout unit is disposed and a region where the user interface portion of the second checkout unit is disposed from one another.

12. The checkout unit assembly according to claim 11, wherein a first side surface of the base that is a side surface on which the user interface portion of the first checkout unit is disposed and a second side surface of the base that is a side surface on which the user interface portion of the second checkout unit is disposed are orthogonal to each other, and the blindfold board is oriented to intersect both the first side surface and the second side surface.

13. The checkout unit assembly according to claim 2, wherein a side surface of the first checkout unit at the user interface portion side and a first side surface of the base that is a side surface on which the user interface portion of the first checkout unit is disposed are flush with each other, and a side surface of the second checkout unit at the user interface portion side and a second side surface of the base that is a side surface on which the user interface portion of the second checkout unit is disposed are flush with each other.

14. The checkout unit assembly according to claim 2, wherein a first loading table is provided to the base, wherein the first loading table is for a first user to use the user interface portion of the first checkout unit, and a second loading table is provided to the base, wherein the second loading table is for a second user to use the user interface portion of the second checkout unit.

15. The checkout unit assembly according to claim 14, wherein the first loading table and the second loading table are disposed at the same level with each other.

16. The checkout unit assembly according to claim 14, wherein the first loading table is disposed higher than the second loading table.

17. The checkout unit assembly according to claim 2, wherein the base has a first side surface that is a side surface on which the user interface portion of the first checkout unit is disposed, a second side surface that is a side surface on which the user interface portion of the second checkout unit is disposed, a third side surface opposite to the first side surface, and a fourth side surface opposite to the second side surface, the third side surface has a first opening formed thereon that communicates with a placement region of the first checkout unit inside the base, and a first lid part provided thereto that is removably attached to the third side surface and closes the first opening, and the fourth side surface has a second opening formed thereon that communicates with a placement region of the second checkout unit inside the base, and a second lid part provided thereto that is removably attached to the fourth side surface and closes the second opening.

18. The checkout unit assembly according to claim 14, wherein the base has a first side surface that is a side surface on which the user interface portion of the first checkout unit is disposed, a second side surface that is a side surface on which the user interface portion of the second checkout unit is disposed, a third side surface opposite to the first side surface, and a fourth side surface opposite to the second side surface, the second loading table is provided to the third side surface, the first loading table is provided to the fourth side surface, the third side surface has a first opening provided thereon that is formed above the second loading table, and communicates with a placement region of the first checkout unit inside the base, and a first lid part provided thereto that is removably attached to the third side surface and closes the first opening, and the fourth side surface has a second opening provided thereon that is formed above the first loading table and communicates with a placement region of the second checkout unit inside the base, and a second lid part provided thereto that is removably attached to the fourth side surface and closes the second opening.

* * * * *